United States Patent [19]

Kubo et al.

[11] Patent Number: 5,250,099
[45] Date of Patent: Oct. 5, 1993

[54] GLASS MOLDING PROCESS AND MOLDING APPARATUS FOR THE SAME

[75] Inventors: Hiroyuki Kubo; Takeshi Nomura; Hiroe Tanaka, all of Tokyo; Nobukazu Yogo, Yokohama; Bunryo Sato, Hachioji, all of Japan

[73] Assignee: Canon Kabushiki Kaisha, Tokyo, Japan

[21] Appl. No.: 677,424

[22] Filed: Mar. 29, 1991

[30] Foreign Application Priority Data

Mar. 29, 1990 [JP] Japan ................................. 2-78896
Nov. 9, 1990 [JP] Japan ................................. 2-302695
Mar. 28, 1991 [JP] Japan ................................. 3-087264

[51] Int. Cl.$^5$ ............................................ C03B 23/00
[52] U.S. Cl. ..................................... 65/102; 65/32.1; 65/157; 65/275
[58] Field of Search ............... 65/102, 64, 286, 103, 65/104, 292, 111, 64, 268, 323, 275, 32.1, 157; 264/2.2, 327; 425/808, 407, 547, 82, 577

[56] References Cited

U.S. PATENT DOCUMENTS

| | | | |
|---|---|---|---|
| 3,244,497 | 4/1966 | Copeland | 65/319 |
| 4,629,489 | 12/1986 | Hirota | 65/102 |
| 4,723,976 | 2/1988 | Shanaberger | 65/29 |
| 4,797,144 | 1/1989 | DeMeritt | 65/102 |
| 4,836,960 | 6/1989 | Spector | 264/2.2 |
| 4,969,944 | 11/1990 | Marechal | 65/102 |

FOREIGN PATENT DOCUMENTS

| | | | |
|---|---|---|---|
| 132525 | 6/1986 | Japan | 65/102 |
| 208334 | 8/1989 | Japan | 65/102 |
| 226744 | 9/1989 | Japan | 65/102 |

Primary Examiner—Joye L. Woodard
Attorney, Agent, or Firm—Fitzpatrick, Cella, Harper & Scinto

[57] ABSTRACT

Disclosed is a glass molding process using an apparatus for manufacturing a glass preform into a glass molded product. In the process a mold is prepared for pressing the glass preform. The mold consists of a pair of molds having a cavity surface for forming the glass molded product, and a frame mold which is movable against the pair of molds and incorporates a heating source. A next step in the process involves introducing the glass preform, where the pair of molds are opened and the glass preform is placed on the cavity surface. The glass preform then undergoes heating, where the glass preform is moved so as to come near the heating source of the frame mold by closing the mold, thereby heating the glass preform. The glass preform is then pressed by moving the mold to mold a shape of a glass molded product. The resulting glass molded product is then separated from the heating source by moving the frame mold and taken out by opening the mold.

10 Claims, 10 Drawing Sheets

GLASS MOLDING PROCESS AND MOLDING APPARATUS FOR THE SAME

BACKGROUND OF THE INVENTION

1. Field of the Invention

The present invention relates to a glass molding apparatus and a molding process using the apparatus. The present invention can be applied to the continuous molding of, for instance, an optical element for non-spherical lenses.

2. Related Background Art

In recent years, a process for manufacturing an optical element having a high-precision, optically functional surface has been developed. In this method the material preform for an optical element, for instance, a glass blank having a certain shape and surface precision by preliminary molding, is housed in a mold having a predetermined surface precision. The press molding is performed in the mold under heating, thereby making a post-treatment such as grinding or polishing unnecessary.

In such a press molding process, generally, the upper mold and lower mold are placed so as to slide and to face each other within the frame mold. The material for molding is introduced into the cavity formed by the upper mold, the lower mold and the frame mold. For the prevention of the oxidation of the mold, the environment for the mold is a non-oxidizing gas such as nitrogen, and the mold is heated to the temperature at which molding becomes possible, for instance, the material for molding becomes $10^8$ to $10^{12}$ poise. The mold is closed for pressing for an appropriate time so that the surface shape of the mold is transferred on the surface of the molding material, and then the mold temperature is cooled down to sufficiently below the glass transition temperature of the molding material. The pressing pressure is removed and the mold is opened to take out the molded optical element.

It is possible to preheat the molding material preform to a suitable temperature before it is introduced into the mold, or to heat the molding material up to a molding temperature and thereafter to introduce it into the mold. In addition, it is also possible to perform heating, pressing and cooling at predetermined places while the molding material and the mold are fed to their respective places, thereby realizing continuous and high speed operation.

The above-mentioned press molding process and its apparatus are disclosed, for instance, in Japanese Patent Laid-Open No. Sho 58-84134, Japanese Patent Laid-Open No. Sho 49-97009, U.K. Patent No. 378199, Japanese Patent Laid-Open No. Sho 63-11529, Japanese Patent Laid-Open No. Sho 59-150728 and Japanese Patent Laid-Open No. Sho 61-26528.

In the conventional molding apparatus of the batch operation for the above mentioned pressing, every time the molding material is introduced into the mold cavity or the molded element is taken out from the mold cavity, the environment in the mold cavity has to be adjusted. In addition, the heating of the mold to a high temperature and the cooling of it down to a low temperature need a long time and a high cost. In the conventional apparatus for continuous operation, a large number of combinations of high precision molds are necessary, and also large equipment is needed such as an atmosphere replacing room, heating room, molding room, cooling room and driving device for successive transportation. In this case, also, the cost is high, and it is not suitable for a small lot production.

In Japanese Patent Laid-Open No. Hei 1-105713, a molding device for press molding is disclosed, wherein a heater is provided and also a cooler is provided with respect to the length direction of the frame mold so that the temperature distribution is formed in the length direction of the frame mold. By moving the upper mold and the lower mold against the frame mold, the cavity position is also moved, and in this way the temperatures of the molding material and the molded optical element are controlled, thereby shortening the time needed for one cycle of the press molding.

However, there is no specific disclosure of a method for controlling the environment. Like in said conventional method, in a case where the mold device is placed in the molding room which can be tightly closed, every time the molding material is introduced and the molded optical element is taken out, the environment of the molding room as a whole has to be replaced, therefore, the shortening of the time for the press cycle is not sufficient yet.

SUMMARY OF THE INVENTION

It is an object of the present invention to provide a glass molding apparatus in which a small number of combinations of molds are used and no large equipment is necessary, and which is suitable for small lot production and with which a repeated press molding in a continuous and speedy manner is possible by simplifying the atmosphere replacement, particularly around the press portion.

Another object of the present invention is to provide a glass molding process which can be performed in the molding apparatus.

According to the present invention, in order to achieve said object, a glass molding apparatus including a frame mold, an upper mold and a lower mold, the upper mold and the lower mold being housed in the frame mold so as to slide in a length direction of the frame mold, the three molds forming a mold cavity, is characterized as comprising, a means for giving a temperature distribution in the length direction of the frame mold, a pipe for feeding a material preform to be molded and a pipe for taking out a molded product, both the pipes being connected to a side of the frame mold, and a pipe for introducing non-oxidating gas into the frame mold through the two pipes, wherein the pipe for feeding the material preform to be molded includes an atmosphere replacing part capable of being degassed and having a valve through which the material to be molded can be passed, and the pipe for taking out the molded product includes an atmosphere replacing part capable of being degassed and having a valve through which the molded product can be passed.

In the present invention, there is an embodiment in which the degassing means is connected to the frame mold.

In the present invention, there is an embodiment in which the pipe for introducing the non-oxidating gas and the pipe for taking out the molded product are connected in facing positions on the side of the said frame mold.

In the present invention, there is an embodiment in which the lower mold and the upper mold incorporate a means for temperature control, respectively.

In the present invention, there is an embodiment in which the thermal expansion coefficient of the lower mold and the upper mold is greater than that of the frame mold.

Furthermore, according to the present invention, in order to achieve the object, a glass molding process using the above mentioned glass molding apparatus, is characterized in that the steps of feeding a molding material preform, heating the molding material preform, pressing, cooling the molded product and taking out the molded product are performed while in the insides of the frame mold, the pipe for feeding the material and the pipe for taking out the molded product, where both the pipes being connected to the frame mold, are maintained with the non-oxidating gas environment.

In the present invention, there is an embodiment in which the frame mold is given a temperature distribution in its length direction, and by moving the mold cavity in the length direction of the frame mold, the heating and cooling of the molding material preform inside the frame mold are performed.

In addition, the present invention is a glass molding process using the glass molding apparatus including the frame mold, the upper mold and the lower mold, the upper mold and the lower mold being housed in the frame mold so as to slide in the length direction of the frame mold, the three molds forming a mold cavity, is characterized in that a molding material is introduced to the mold cavity at a temperature lower than the glass transition temperature, the mold cavity is closed by sliding the lower mold and the upper mold with respect to the frame mold in the length direction of the frame mold while maintaining the distance between the lower mold and the upper mold longer than that on pressing, the molding material is heated to a molding temperature which is caused by the radiation heat and conduction heat derived from the heating of the lower mold, the upper mold and frame mold, and then the lower mold and the upper mold are brought closer to press.

Furthermore, the present invention provides a new process for the molding of glass material. The glass molding method of the present invention comprises the following steps:

Preparing a mold for pressing the glass material, wherein the mold consists of an upper mold, a lower mold both having a cavity surface for forming a glass molded product, and a frame mold which slides against the upper mold and the lower mold and which incorporates a source for heating, introducing the glass material preform, wherein the upper and lower molds are kept open and the glass material is placed on the cavity surface of the lower mold, in the introduction of the glass material the upper mold is moved to a position closer to the heating source than the lower mold, thereby setting the temperature of the upper mold higher than that of the lower mold.

pressing the glass material, wherein the glass material is closed within the cavity surfaces of the upper and lower molds and the positions of the upper, lower and the frame molds are adjusted so that the heat from the heating source conducts to the glass material preform.

moving the frame mold to detach the heating source from the closed cavity surface of the upper and lower molds; and opening the upper and lower molds to take out the glass molded product.

That is, the frame mold comprises the upper and lower molds and the heating source, and the frame mold is permitted to move against the upper and lower molds, whereby the temperature adjustment of the glass material and the molds are performed to obtain the temperature condition necessary for molding.

In addition, the present invention provides a new process for taking out the glass molded product which is pressure molded with the upper mold and the lower mold. That is, an injection inlet and gas injection means for injecting a gas to the frame mold pivotably sliding against the upper and lower molds are provided and a discharge outlet and a discharge passage are connected to the frame mold so that the molded product is discharged from the discharge outlet to the discharge passage by the gas injection means after the molding is finished.

Further, the present invention offers improvements about a glass molding apparatus having a guiding member, which slides in relation to the upper and lower molds for pressing glass material thereby deforming optical elements and has a source to heat the glass material. One improvement is to provide a a process or an apparatus having displacement sensor by which the amount of movement of the upper mold for pressing the glass material is controlled correctly to finish the thickness of an optical element such as a lens with high accuracy.

The second improvement is to provide an apparatus in which the guiding member moves in relation to the upper and lower molds as mentioned above, wherein the hollow inside the guiding member contains a sleeve member, and the upper mold and the lower mold are fitted into the inside of the sleeve member which is designed to move relative to the sleeve member, and the dimensional accuracy of the lens thickness is improved by the sleeve member.

DESCRIPTION OF THE PREFERRED EMBODIMENTS

Preferred embodiments will be explained with reference to the accompanying drawings.

Figure 1:
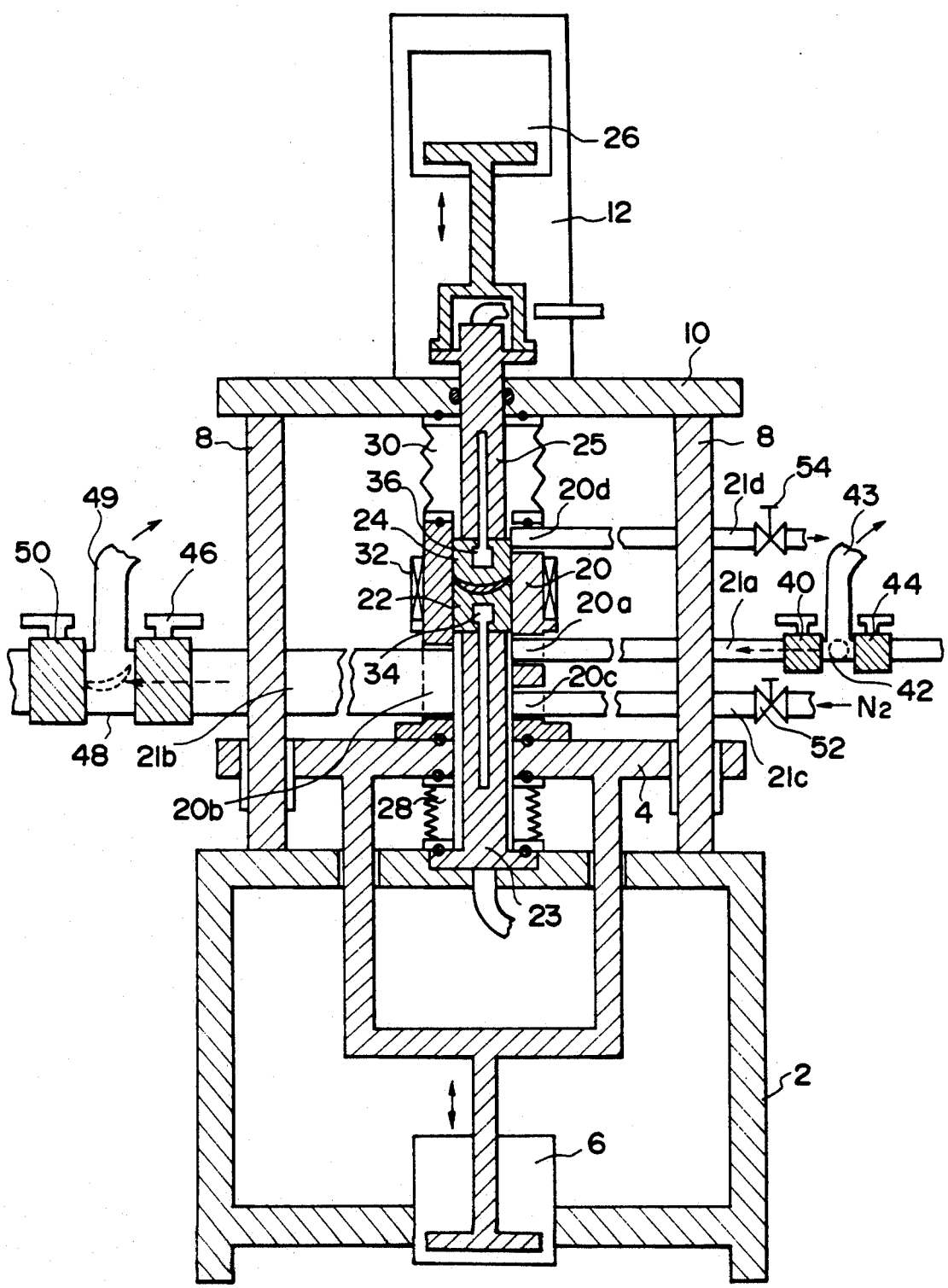
FIG. 1 is a cross sectional view of essential part of the molding apparatus according to the present invention.
Figure 2:
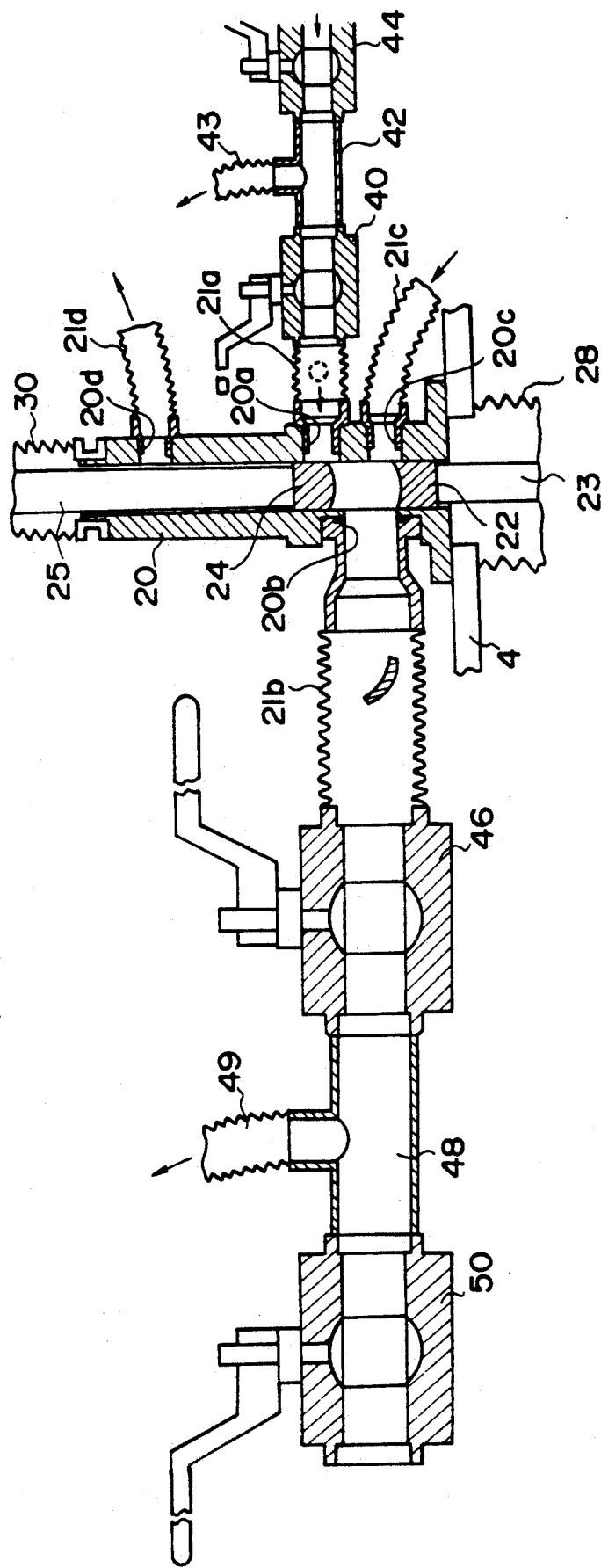
FIG. 2 is a partially enlarged cross sectional view of the apparatus of FIG. 1.

FIG. 1 is a cross sectional view which illustrates the gist of the structure of a preferred embodiment of the glass molding apparatus according to the present invention. FIG. 2 is its partially enlarged view. This preferred embodiment is an example of press molding for optical element.

In FIG. 1, 2 is a stand and on the stand 2 a frame mold supporting table 4 which can slide in the up and down direction against the stand 2 is installed. On the stand 2, a cylinder 6 is installed under the supporting table 4 and its piston rod is connected to the lower end of the supporting table 4.

A column 8 is vertically installed on the stand 2 and the supporting table 4 is connected to the column 8 so as to slide freely in the up and down direction. On the upper end of the column 8, an upper plate 10 is fixed, and on the upper plate 10 a cylinder housing 12 is installed.

On the frame mold supporting table 4, the bottom end of a frame mold 20 is connected. The frame mold 20 is placed in the vertical position, and in the frame mold 20 upper mold 24 is placed so as to slide in the up and down direction.

The top surface of the lower mold 22 and the bottom surface of the upper mold 24 are transference surfaces for the formation of the optically functional surface of the optical element (lens) to be molded, and the top and bottom surfaces are finished to the desired surface precision. These transcription surfaces and the inner surface of the frame mold 20 form the mold cavity.

At the bottom of the lower mold 22, a supporting rod 23 is vertically installed, and the bottom end of the rod 23 is fixed to the top surface of stand 2. On the top of the upper mold 24 a supporting rod 25 is vertically installed, and the top end of the rod 25 is extended through the upper plate 10 to the inside of the cylinder housing 12. The rod 25 can slide in the up and down direction against the upper plate 10. The upper part of the rod 25 is connected to the bottom end of the piston rod of the cylinder 26 which is housed in the cylinder housing 12.

Around the rod 23 between the upper surface of the stand 2 and the lower surface of the supporting stand 4 is installed an air tight and expandable bellows 28. Also, around the rod 25 between the upper end of the frame mold 20 and the lower surface of the upper plate 10 is installed an air tight and expandable bellows 30. On the side part of the frame mold 20, an opening 20a for feeding the molding material, an opening 20b for taking out the molded optical element, an opening 20c for introducing non-oxidating gas and an opening 20d for degasing of air are formed, and to these openings, a pipe 21a for feeding the molding material, a pipe 21b for taking out the mold optical element, a pipe 21c for introducing non-oxidating gas and a pipe 21d for degasing of air are connected, respectively. These pipes 21a to 21d all have flexible parts within them.

On the outer surface of the upper portion of the frame mold 20, a heater 32 is installed. Within the lower mold 22, a heater 34 is incorporated. Within the upper mold 24, a heater 36 is incorporated. Though not shown in the drawing, outside of the lower part of the frame mold 20, a cooler using an air blowing system may be installed. Within the upper mold 24 and the lower mold 22, a cooler using a cooling water circulation system may be installed, respectively. In addition, the frame mold 20, the lower mold 22 and the upper mold 24 may be provided with a thermocouple for detecting the temperature.

The pipe 21 for feeding the molding material has an entrance side atmosphere replacing part 42. This atmosphere replacing part 42 has ball valves 40 and 44 on both sides, and is connected through valve 43 to a depressurizing source (not shown) to degass air.

The pipe 21b for taking out the molded optical element has a molded optical element taking out side atmosphere replacing part 48. This atmosphere replacing part 48 has ball valves 46 and 50 on both sides, and is connected through valve 43 to a depressurizing source (not shown) to degass air.

The pipe 21c for introducing the inert gas is connected through valve 52 to a source of nitrogen gas which is a non-oxidizing gas. Also, the pipe 21d for the degassing of air is connected through valve 54 to a depressurizing source.

The operation of said preferred embodiment will be explained. FIG. 3 to FIG. 8 are front views of the apparatus, for illustrating particularly the parts which undergo certain change as the operation proceeds. In these drawings, the same parts as shown in FIG. 1 and FIG. 2 are given the same numerials as in these two drawings.

Figure 3:
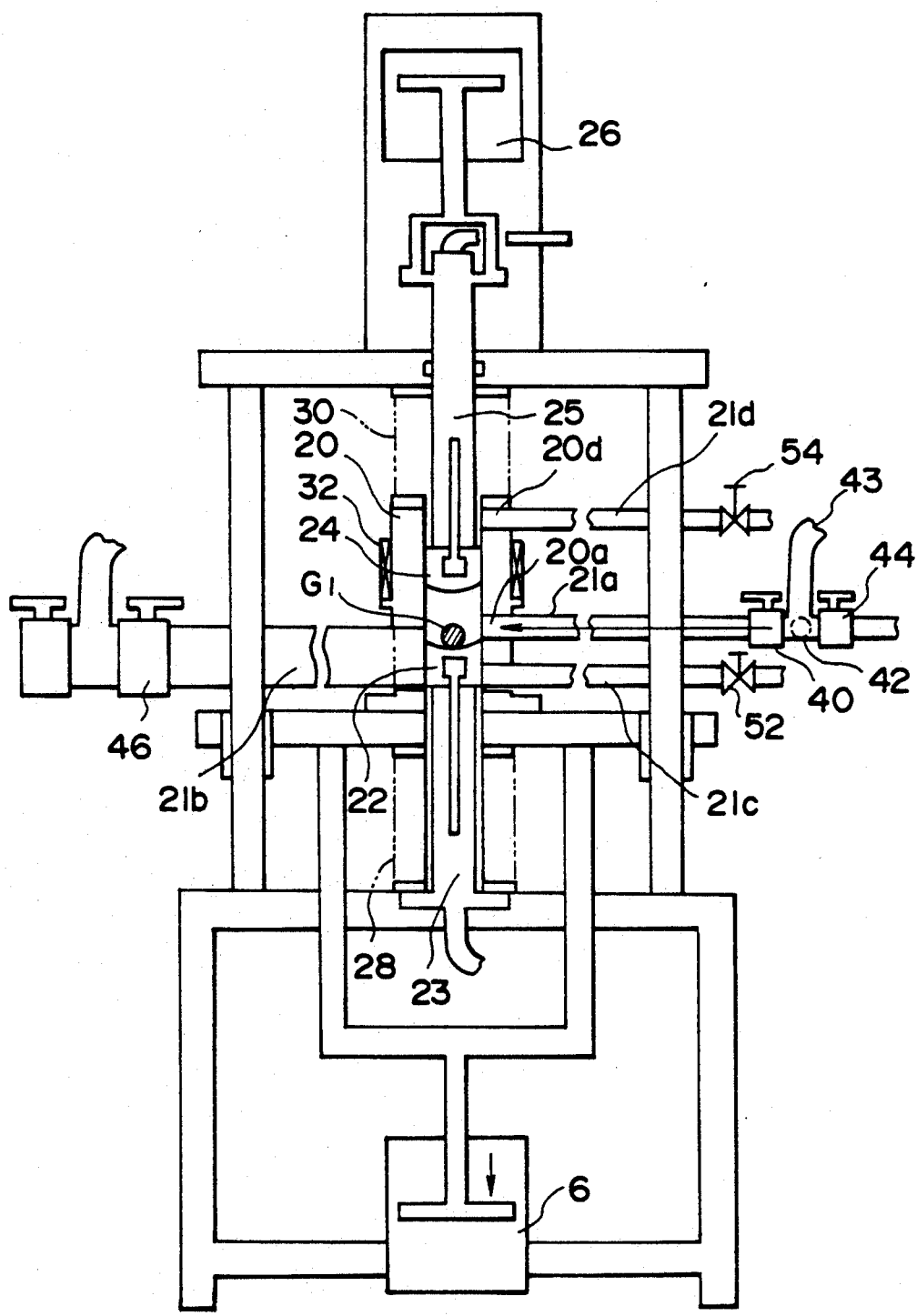
FIG. 3 is a front view of the apparatus of FIG. 1 for explaining the process of introducing the glass material by opening the space between the upper and lower molds.

At first, as shown in FIG. 3, the position of cylinder 26 is determined so that the distance between the lower mold 22 and the upper mold 24 is sufficiently larger than the desired thickness of the optical element. Then cylinder 6 is driven to adjust the frame mold 20 at such a position that the opening 20a for feeding the molding material comes just above the top surface of the lower mold 22.

The inside space including the cavity of the frame mold 20, bellows 28 and 30, pipes 21a, 21b, 21c and 21d can form an air-tight closed system. At the beginning, the valves 40, 46 and 52 are closed and the closed system is degassed to $1 \times 10^{-2}$ Torr After that, the valve 54 is closed and the valve 52 is opened to introduce nitrogen gas to the closed system.

Then the valve 52 is closed, the valve 44 is opened, and the molding material G1 is introduced into the inlet side atmosphere replacing part 42 from a magazine (not shown), and then the valve 44 is closed. The introduction of the molding material G1 into the replacing part 42 is detected by a sensor (not shown). The control of the subsequent processes is done sequentially on the basis of the detection.

The molding material G1 is in a spherical shape having the same volume as the desired optical element and its surface is mirror finished. Through pipe 43, the air in the atmosphere replacing part 42 is degassed and the valve 40 is opened. The pipe 21 a has a slope from the atmosphere replacing part 42 down to the frame mold 20. Thus, under the above conditions, the molding material G1 rolls into the mold cavity (on lower mold 22). Then, valve 40 is closed.

In this process, the temperatures of the lower mold 22 and the upper mold 24 are kept below the glass transition temperature with the heaters 34 and 36, respectively. The temperature of the upper part of frame mold 20, namely close to the heater 32 is kept higher than the glass transition temperature of the molding material with the heater and this condition is maintained throughout the subsequent processes.

In this way, the frame mold 20 has a temperature distribution in the length direction, the temperature being high in the upper part and low in the lower part.

Figure 4:
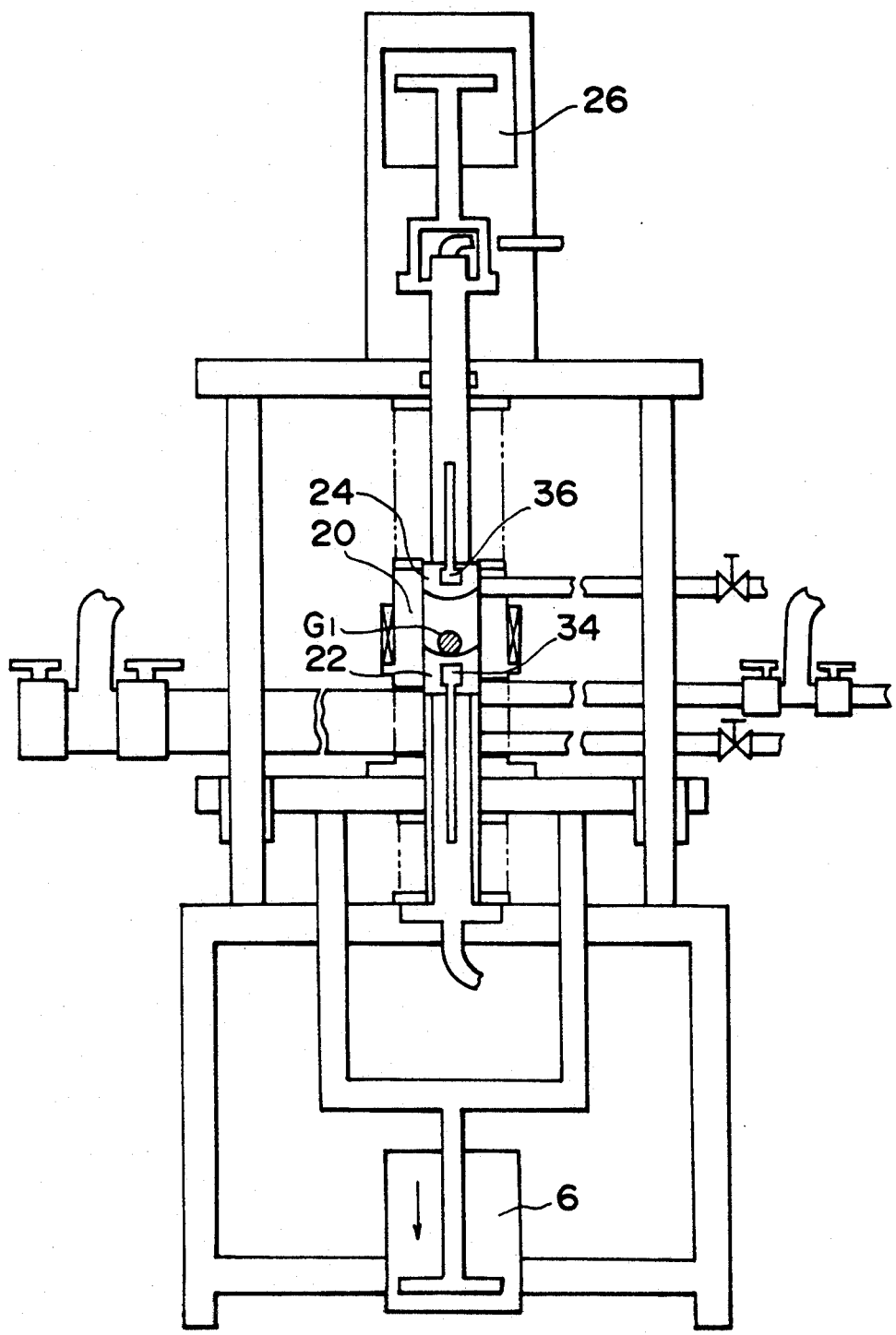
FIG. 4 and FIG. 5 are front views of the apparatus of FIG. 1 for explaining the process of pressure molding of the glass material with the upper and lower molds.

Then, as shown in FIG. 4, the cylinder 6 is operated to move the frame mold 20 downward till the mold cavity is positioned at the upper part of the body shaped mold (the hight corresponding to the heater 32). In this movement, as stated above the temperature of the upper part of the frame mold 20 is kept higher than the temperatures of the lower mold 22 and the upper mold 24, and because of this, there is a sufficient clearance between the inner surface of the frame mold and the outer surfaces of the lower mold and the upper mold, making the movement smooth.

Then the heaters 34 and 36 are controlled to raise the temperatures of the lower mold 22 and the upper mold 24 to the level at which the molding is possible, namely above the glass transition temperature of the molding material G1. This heating can start at the same time as the start of lowering the frame mold 20, and the heating of the upper mold 24 may be started slightly after the start of heating the lower mold 22.

Figure 5:
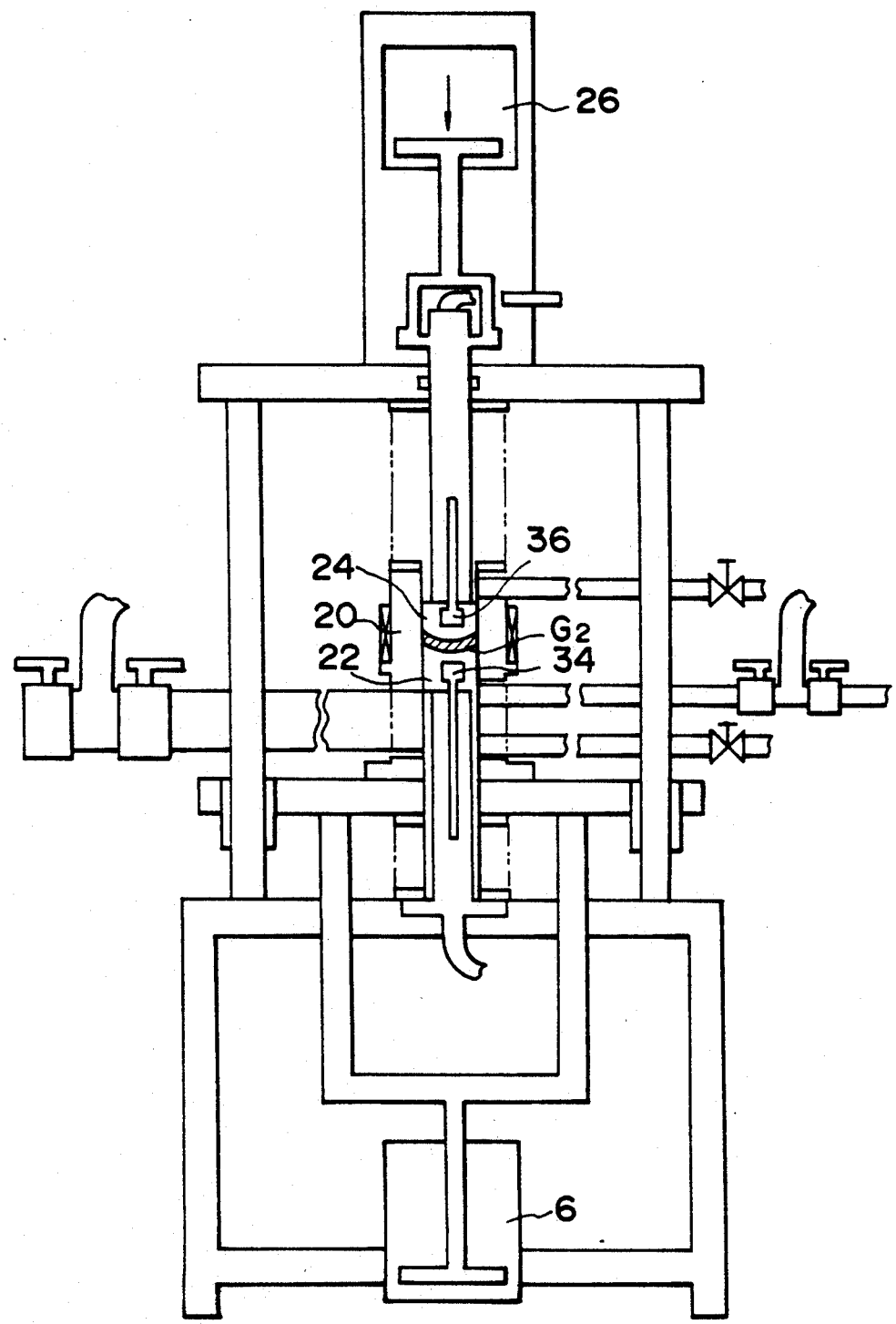

Then, as shown in FIG. 5, the cylinder 26 is operated to move the upper mold 24 downward to press the molding material to form the optical element G2, and this press condition is kept for an appropriate time. The press pressure is for instance 3-100 kg/cm$^2$ in terms of surface pressure.

In order to maintain the clearance between the upper mold 24 and the inner surface of the frame mold when the former is moved as stated above, the heating of the upper mold 24 is started slightly after the start of the heating of the lower mold 22 so that when the temperature of the upper mold 24 slightly surpasses the glass transition temperature of the molding material (but has not reached the temperature of the upper part of the frame mold 20) the pressing can start.

The cylinder 26 is equipped with the position movement sensor and from the output of the sensor, the progress of the press operation can be detected. Namely, when the output of the position movement sensor is saturated, it can be judged that the material is filled in the cavity.

When the press operation is completed, the temperatures of the frame mold 20, the lower mold 22 and the upper mold 24 become almost equal, the clearance between the inner surface of the body shaped mold and the outer surfaces of the lower and upper molds sufficiently small to close the cavity. After the pressing condition is maintained for an appropriate time as described above, the press pressure from the cylinder 26 is released and the self-weight of the upper mold 24 alone is applied. Also the heating of lower mold 22 and the upper mold 24 with heaters 34 and 36 is stopped respectively and the temperatures of these molds are kept below the glass transition temperature.

Figure 6:
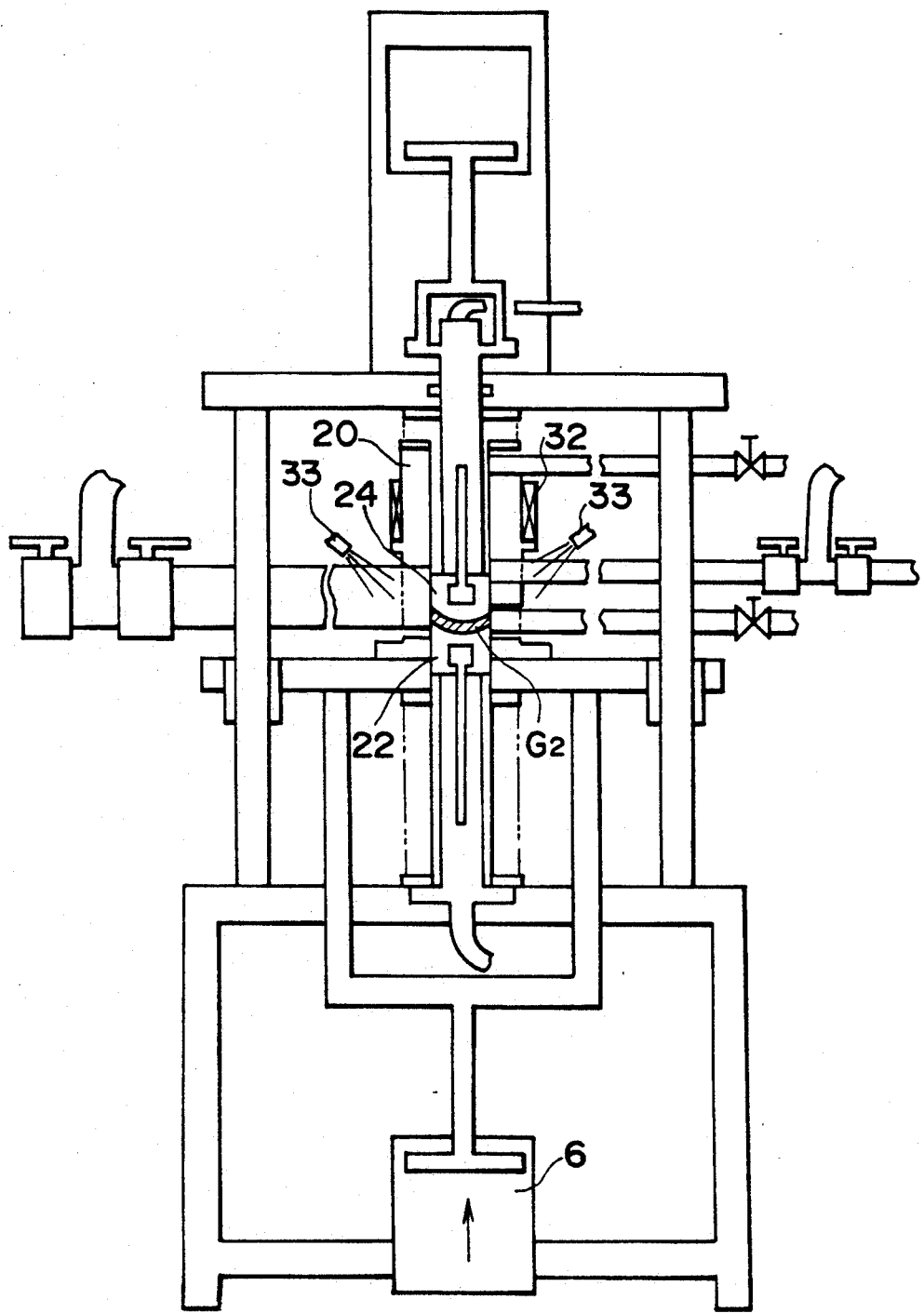
FIG. 6 is a front view of the apparatus of FIG. 1 for explaining the temperature control of the molds after the glass material is molded into the glass molded product.

Then, as shown in FIG. 6, the cylinder 6 is operated to move the frame mold 20 upward. With this operation the influence of the heating of optical element G2 with the heater 32 is lessened, and coupled with the control of the temperatures of the lower mold 22 and the upper mold 24 at below the glass transition temperature, the temperature of the optical element G2 gets gradually lower. In addition, the lower part of the frame mold 20 may be cooled down with the cooler 33 as necessary. By these operations, the optical element G2 can be taken out and kept at a desired temperature.

In this process, since the lower mold 22 and the upper mold 24 are controlled at temperatures lower than the upper part of the frame mold 20, the clearance between the inner surface of the upper part of the frame mold and the outer surfaces of the upper and lower molds is sufficient to make the movement smooth. In this operation, the heating with the heater 32 may be stopped. Thus, the cooling time can be shortened.

Figure 7:
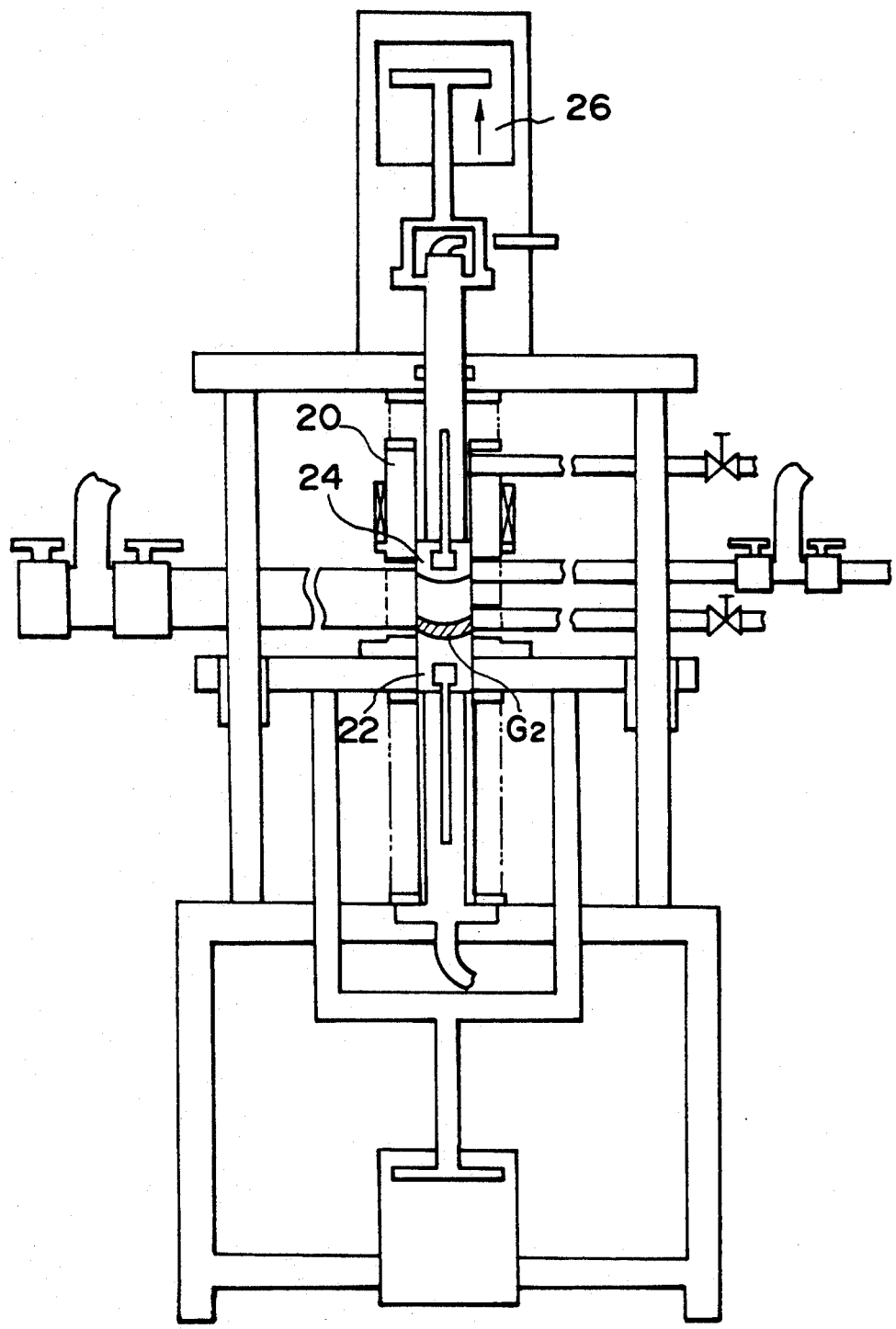
FIG. 7 and FIG. 8 are front views of apparatus of FIG. 1 for explaining the process of taking out the glass molded product.

In the next step, as shown in FIG. 7, the cylinder 26 is operated to raise the upper mold 24 upward. By this, the optical element G2 is detached from the upper mold 24 and is placed on the lower mold 22.

Figure 8:
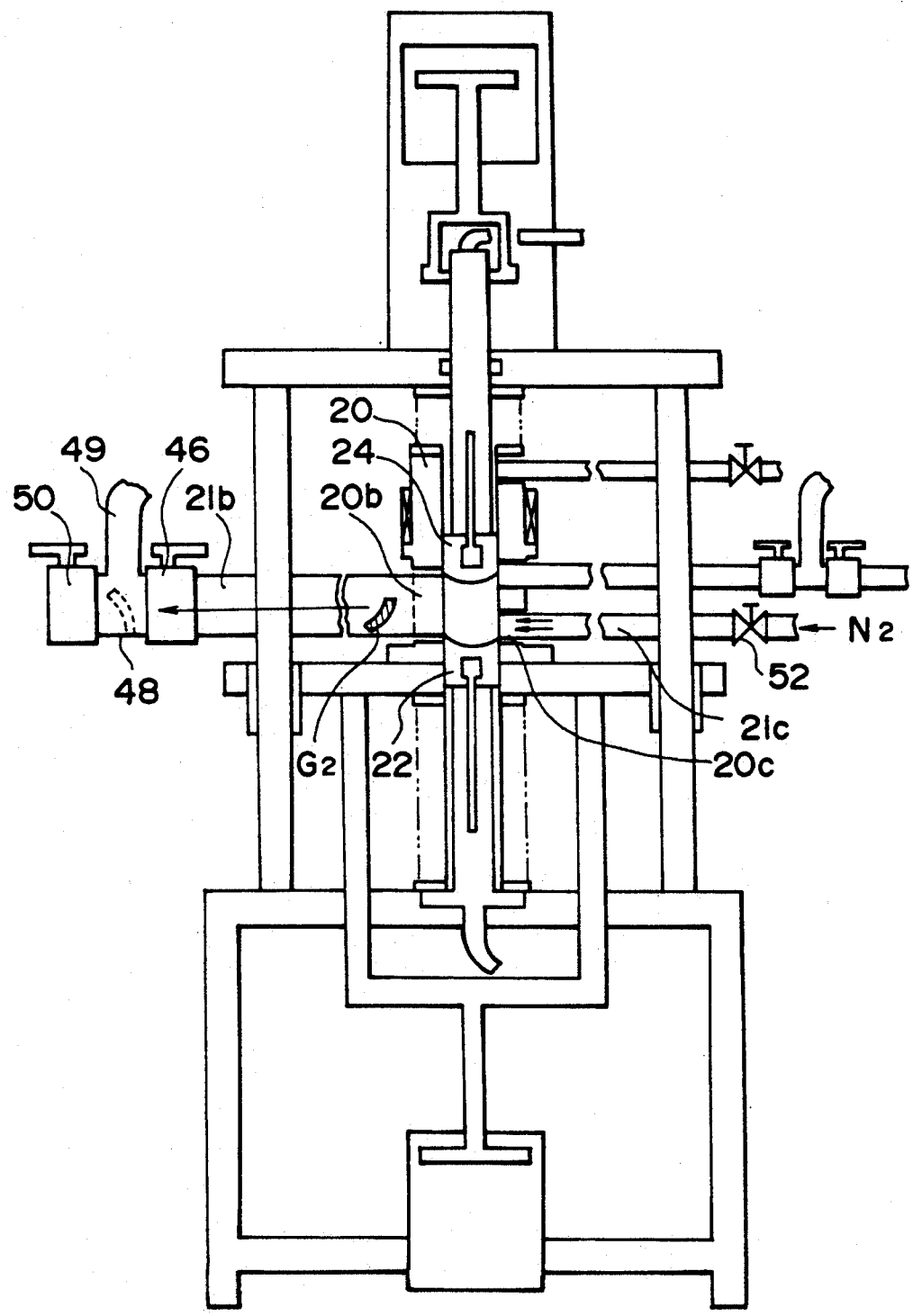

Next, as shown in FIG. 8, the valve 46 is opened and then the valve 52 is opened to introduce nitrogen gas, with which the optical element G2 is blown off the lower mold 22 and sent through the pipe 2b to the atmosphere replacing part 48 which is already degassed.

After that, the valves 46 and 52 are closed and the valve 50 is opened to take out the optical element G2. Then the valve 50 is closed and the atmosphere replacing part 48 is degassed.

After that, by repeating the processes of the above mentioned FIG. 3 on, the next press cycle can be started immediately. The degassing of the closed system explained in relation to the above FIG. 3 is conducted in the first cycle, and thereafter by maintaining the nitrogen gas atmosphere all the time, it can be skipped from the second cycle on. Of course, however, the degassing of the closed system may be conducted in each cycle.

Furthermore, if the above mentioned atmosphere replacing parts 42 and 48 are equipped with the heating devices, by heating the molding material for the next cycle while it is maintained there, the heating time in the frame mold can be shortened.

In the explanation so far, the shape of the molding material is spherical and thus its transfer to the cavity was easy, but the shape is not limited to it but can be like the shape of the optical element to be molded, in which case the molding time can be shortened.

Furthermore, it is possible to use materials having different thermal expansion coefficients for the frame mold 20 and the lower and upper molds 22 and 24. Namely, by using the material having the larger thermal expansion coefficient for the lower mold 22 and the upper mold 24 than that of the material to be used for the frame mold 20, the mold cavity will be more tightly closed at the time of pressing and the lower and upper molds slide better against the frame mold.

In the above explanation, the movement of the upper mold 22 is terminated when the glass obtains the shape corresponding to the mold cavity, but as alternative methods, the movement of the upper mold may be terminated by the detection of the movement of the mold in predetermined strokes, or by the mechanical stop of the movement of the mold using a stopper. In this case, however, the mold cavity needs to have the space for pushed out surplus glass, which is to be removed as necessary after the press molding.

A concrete example of making an optical lens through press molding using the above mentioned apparatus of the preferred embodiment, will be explained.

As the material to be molded, a spherical substance made of the optical glass SF8 with the diameter of 11.85 mm was used.

The lower mold and upper mold had the external size of 25 mm, and were made of MOB ceramic to which HIP treatment was given having the thermal expansion coefficient of $80 \times 10^{-7}$/°C. The molding surface which forms the optical surface was finished to have the predetermined shape and precision by grinding and polishing, and its outer diameter precision and the misalignment were less than 3 μm.

The frame mold had the length of about 180 mm, and its material was TiN thermet having the thermal expansion coefficient of $45 \times 10^{-7}/°C$. The inner surface which slides against the lower mold and the upper mold was sufficiently finished, and the circularity and the variation of the inner diameter were within 1 μm. The temperature of the upper and lower molds in the waiting condition was 350° C., and the temperature of the upper part of the frame mold close to the heater was 490° C.

The time needed to degass (air) the above mentioned closed system down to $1 \times 10^{-2}$ Torr and to fill the closed system with nitrogen gas up to the atmospheric pressure was within 30 seconds. In the conventional batch system apparatus, for press molding the equivalent glass to that in the present example, the time for the atmosphere replacement of the inside of the molding chamber as a whole was about 6 to 7 minutes. Thus, in the present example, sufficient shortening of time was possible.

Next, the controlled temperature of the lower mold at the time of heating and pressing the molding material was 510° C., and this control was started when the frame mold started moving downward as shown in FIG. 4. In about 22 seconds, the controlled temperature was reached. The controlled temperature of the upper mold was also 510° C., but the start of this control was about 13 seconds after the start of the control of the lower mold. Because of this, the movement of the upper mold at the time of pressing was smooth.

The pressing may be started when the temperature in the cavity becomes constant, but in this case, it was started when the temperature of the upper mold reached 450° C., which is slightly above the glass transition temperature, i.e., 445° C. The press pressure was 15 kg/cm².

The time needed from the start of the pressing to the molding of material which was deformed into the shape of the cavity was 13 seconds. In order to make the temperature distribution of the thus obtained optical element even, the pressing condition was maintained for about 5 additional seconds. After that the application of the press pressure from the upper mold was stopped, and the temperature of the lower and upper molds was controlled at 350° C.

The temperature of the lower part of the frame mold was about 200° C., and this part was cooled down by blowing air to it. In 20 seconds, it became possible to take out the molded optical element, and it was taken out by the blowing of nitrogen gas. During this operation, the frame mold and the upper mold were raised upward.

The time needed for the above mold cycle was about one minute, and sufficient shortening of time from what was realized as compared with the time of one cycle (about one hour) needed for the conventional batch system apparatus.

As stated above, in the above preferred embodiment, the capacity of the closed system for the atmosphere replacement is made small to the minimum possible level for the apparatus with which the continuous pressing is possible, and because of this, the size of the apparatus can be made small, the time needed for the atmosphere replacement can be shortened, and the gas usage can be saved.

By giving a temperature distribution to the frame mold in its length direction, and by conducting the feeding of the molding material and the taking out of the molded product while maintaining the position of the mold cavity at the low temperature section of the frame mold and conducting the pressing operation after the position of the mold cavity is transferred to the high temperature section, it is possible to quickly change the temperature within the mold cavity, thereby shortening the time needed for heating the molding material, and pressing and cooling the molded product.

By using a material having a larger thermal expansion coefficient for the lower the upper molds than the expansion coefficient for the material used for the frame mold, and by operating the temperature control of the lower and upper molds independently from the other temperature control, it is possible to have the mold cavity firmly closed at the pressing, and to maintain the good sliding properties of the lower and upper molds against the frame mold.

In the above preferred embodiment, the frame mold is placed in the perpendicular position and the lower and upper molds are placed in the frame mold in the up and down position, but the present invention is not limited to this arrangement. The orientation of the frame mold can be determined with flexibility and the lower and upper molds need not be placed in the up and down position so long as they can slide in the frame mold, for instance the horizontal arrangement is included in the present invention.

As explained above, by the use of the apparatus of the present invention, continuous and quick press molding can be performed in repetition, with a small number of combinations of the molds to be used, without a large scale apparatus, and being suitable for small lot production and particularly with simplified atmosphere replacement around the press, since the feeding of the material for molding, heating and pressing of the material for molding, and cooling and taking out of the molded product are performed while maintaining the frame mold, the pipe for feeding the molding material and the pipe for taking out the molded product in the non-oxidating gas atmosphere.

According to the present invention, the molding material is introduced to the mold cavity at a temperature lower than the glass transition temperature of the material, and while keeping the distance between the lower and upper molds larger than that at the time of pressing, the lower and upper molds are slid against the frame mold in its length direction to close the mold cavity, and the molding material is heated to the temperature at which the molding is possible with the radiation and conductive heat derived from the heating of the lower mold, upper mold and the frame mold, and thereafter since the pressing is done while keeping the upper mold and lower mold closer, the efficiency of heat energy utilization is high, the press cycle can be shortened and continuous and quick press molding in repetition is possible, and the apparatus can be made small and a good quality molded product can be obtained.

A second example will be explained. With reference to the following Table 1, temperature conditions of an actual press experiment and its results are given below.

The body mold upper temperature and the upper mold temperature and lower mold temperature during the stand-by time (before introduction of molding materials into the mold cavity) were set as follows:

Body mold upper temperature: 350° C. or 490° C.

Upper mold temperature and lower mold temperature: 250° C., 350° C. or 510° C.

Immediately after molding materials are introduced into the mold cavity, all of the frame mold upper temperature, upper mold temperature and lower mold temperature were set at 510° C. The pre-heating temperature of the molding materials which would be introduced into the mold cavity was 300° C. or 480° C.

The pressing was started when all of the above frame mold upper temperature, upper mold temperature and lower mold temperature exceeded 490° C. The pressure given was 15 kg per unit area of molding materials, and the pressure was given for 18 seconds.

By combining, as appropriate, the frame mold upper temperature, the upper mold temperature and the lower mold temperature during the stand-by and the pre-heating temperature of the molding materials, continuous press molding was conducted 10 to several tens of times. The time required for the deformation of molding materials into their final shapes were stable at about 13 to 15 seconds.

After the molding is over, the set temperature of the frame mold upper part was brought to the above standby temperature. The power supply to the lower mold part and the upper mold part was interrupted.

The temperature of the body shape mold lower part was about 200° C., and air-blow cooling was given to said part. In about 20 seconds, the molded optical element becomes able to be taken out, and the element was taken out by a nitrogen gas blow.

After the molded optical element was taken out, the power to the heater for the lower mold and the upper mold was supplied again and the temperature for these molds was set to the stand-by temperature.

Measurement was made about the time required from the introduction of the molding material into the mold cavity to the start of press, namely the time required for the heating of molding material (t) and one cycle time for continuous press molding (T). Furthermore, the quality of the molded product was examined.

TABLE 1

| Experiment No. | Stand-by temperature (°C.) frame mold/ upper mold/ lower mold | Pre-heating temperature of material (°C.) | t,T (sec.) t/T | Quality of molded product |
|---|---|---|---|---|
| 1 | 350/250/250 | 25 | 35/79 | OK |
| 2 | 350/250/250 | 300 | 30/75 | OK |
| 3 | 350/250/250 | 480 | 29/74 | NG1 |
| 4 | 350/350/350 | 25 | 27/72 | OK |
| 5 | 350/350/350 | 300 | 24/67 | OK |
| 6 | 350/350/350 | 480 | 22/65 | NG1 NG2 ... 20% |
| 7 | 350/250/350 | 25 | 32/76 | OK |
| 8 | 350/250/350 | 300 | 27/71 | OK |
| 9 | 350/250/350 | 480 | 24/67 | NG1 NG2 ... 20% |
| 10 | 350/350/250 | 25 | 35/80 | OK |
| 11 | 350/350/250 | 300 | 30/74 | OK |
| 12 | 350/350/250 | 480 | 29/74 | NG1 NG2 ... 10% |
| 13 | 490/350/350 | 25 | 22/60 | OK |
| 14 | 490/350/350 | 300 | 18/55 | OK |
| 15 | 490/350/350 | 480 | 18/55 | NG1 NG2 ... 30% |
| 16 | 490/510/510 | 25 | 15/52 | OK |
| 17 | 490/510/510 | 300 | 10/46 | NG2 ... 10% |
| 18 | 490/510/510 | 480 | 8/44 | NG1 NG2 ... 90% |
| 19 | 490/350/510 | 25 | 18/55 | OK |
| 20 | 490/350/510 | 300 | 13/51 | NG2 ... 10% |
| 21 | 490/350/510 | 480 | 12/50 | NG1 NG2 ... 80% |
| 22 | 490/510/350 | 25 | 19/55 | OK |
| 23 | 490/510/350 | 300 | 15/53 | OK |
| 24 | 490/510/350 | 480 | 13/52 | NG1 NG2 ... 30% |

In Table 1. "OK" means good, "NG1" means having distinctive dirt on the surface layer of the molded product and "NG2 ..." indicates the non-filling in terms of occurence frequency. The non-filling occurs when molding materials harden without filling the inside of the mold cavity entirely.

In this way, time required for each molding cycle was about 50 to 80 seconds, and sufficient shortening of time was realized as compared with the time (about 1 hour) needed for one cycle with the conventional batchwise apparatus. From the result of the above Table 1. it was found that dirt took place on the surface layer part of the molded product when the molding material was introduced into the mold cavity after being pre-heated to 480° C. This is because the surface layer part of the molding material rolls in the dirt within the introduction pipe when the molding material is introduced into the mold cavity. Therefore, the pre-heating temperature of molding materials should be below the glass transition temperature or preferably below 400° C. Thus, the above experiment Nos. 3, 6, 9, 12, 15, 18 21 and 24 are examples of comparison outside the scope of the present invention.

The non-filling took place to some extent in the above experiment Nos. 17 and 20. This is within a permissible range from the viewpoint of production yield.

The occurrence of the above non-filling seems attributable to the fact that in the introduction of the molding materials into the mold cavity, they collide with the mold part to collapse the spherical shape or adhere slightly to the mold to be located away from the center of the lower mold.

This non-filling is more likely to take place when the temperature of the mold, particularly of the lower mold is higher or the pre-heating temperature of the molding material is higher. From this standpoint also, it is desirable to set the preheating temperature of the molding material below the glass transition temperature or preferably below 400° C. Also desirable is to keep the stand-by temperature of the lower mold part below the glass transition temperature of the material or preferably below 400° C.

On the other hand, the above t and T, needless to say, become shorter with higher stand-by temperature of the mold and higher pre-heating temperature of the molding material, making it possible to shorten the press cycle. While the above embodiments used spherical molding materials, the present invention includes producing a product having shapes other than spherical shape of molding material such as a shape close to that of final molded product.

Further, the above Examples used such a mode in which temperature distribution of the molding body mold was given to a length direction and the cavity was postioned on the high-temperature side at the time of closing the mold cavity. But the present invention can be also applied to other modes.

In the above Embodiment, the body shape mold is arranged in the upper and lower directions, while the lower mold and the upper mold are situated upward and downward within the frame mold. The present invention, however, is not so limited. The direction of the frame mold can be chosen freely. The lower mold and the upper mold need not be situated in the upward and downward directions so long as they are movable within the body shape mold. For example, those arranged in a horizontal direction can be covered by the present invention.

As explained above, according to the present invention, the molding material preform is introduced into the mold cavity at a temperature lower than the glass transition temperature, the lower mold and the upper mold are moved to the longitudinal direction relative to the body mold to close the mold cavity while keeping the gap between the lower mold and the upper mold larger than the gap at the time of press, the molding material is heated to the moldable temperature by utilizing radiation heat and conductive heat from the heated lower mold, upper mold and frame mold and thereafter the upper mold and the lower mold are closer to be pressed, so that the utilization efficiency of thermal energy is high and press cycle can be shortened making it possible to conduct the press molding repeatedly and promptly and at the same time make the apparatus smaller, resulting in molded products having high quality.

Another embodiment will be explainned.

Figure 9:
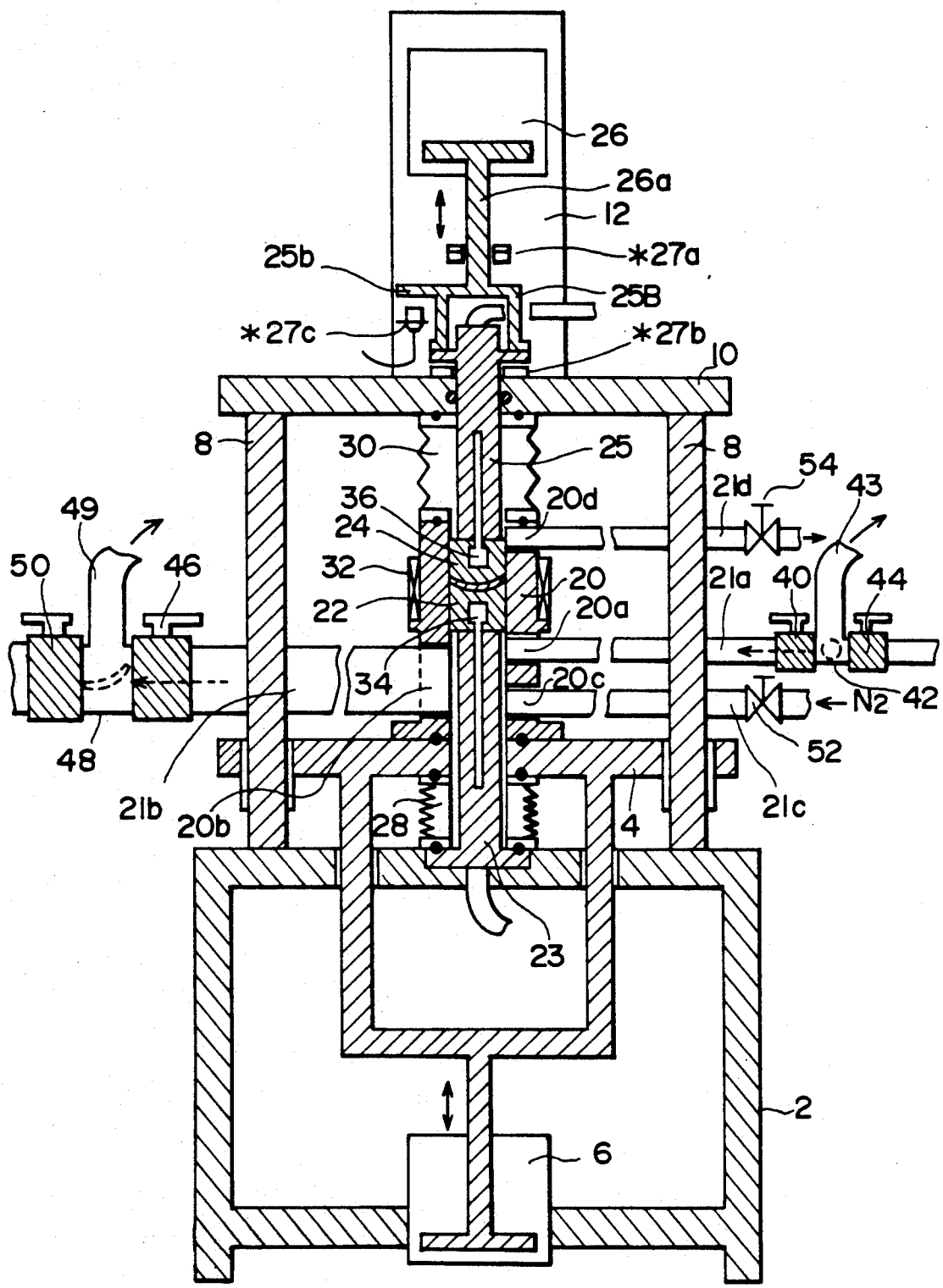
FIG. 9 is a cross sectional view of the apparatus in another embodiment according to the present invention.

FIG. 9 shows an example using a displacement sensor. FIG. 9 gives the structure in which a displacement sensor 27 c, stoppers 27 a and 27 b were added to the apparatus shown in FIG. 1. Other structure is the same as that of FIG. 1. The upper end stopper 27 a is attached to the cylinder holder 12 and controls the stoppage location at the time of ascending of the cylinder rod 26 a. The lower end stopper 27 b is attached to the upper flat plate 10 and controls the stoppage location at the time of descending of rod 25. The displacement sensor 27 c is attached to the cylinder holder 12 and comes into contact with the sensor dog 25 b of the connecting part 25 B which connects cylinder rod 26 a with rod 25 when the upper mold 24 descends by the actuation of the cylinder 26, thereby to output a signal corresponding to the descending of the upper mold 24.

When said output has reached a certain set value or when the output has detected the saturation by arithmetic operation, it can be considered that the mold cavity has been filled with glass, or deformation has taken place to a specified thickness. At this point, an electric signal can be given to the driving system of the cylinder 26 to stop the pressurizing or to proceed to the following cooling step. Examples of the sensor that can be utilized are a non-contact type displacement meter which measures eddy current loss, light sensor which measures reflection light amount and contact-type linear scales.

Figure 10:
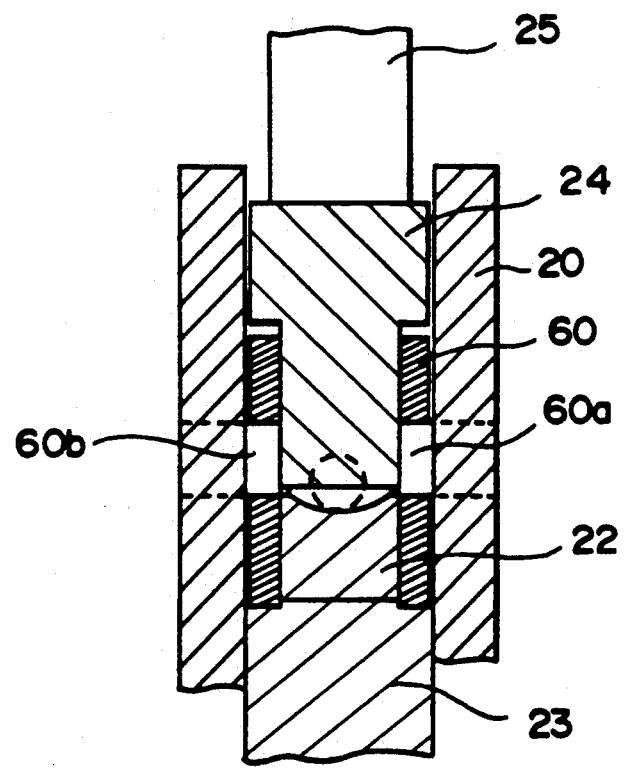
FIG. 10 is a cross sectional view of the mold structure in further another embodiment according to the present invention.

FIG. 10 shows a further another embodiment in which the sleeve member 60 is inserted inside the guiding member 20 to attach the upper mold 24 and lower mold 22 to the sleeve 60.

The sleeve member 60 is placed on the upper surface of the supporting rod 23 of FIG. 1, and the upper mold and lower mold are placed in its inside. The lower mold 22 is attached to the supporting rod 23 and also connected to the sleeve 60.

On the side wall of the sleeve 60 are formed holes 60 a and 60 b which correspond to the respective openings 20 a, 20 b and 20 c of the above-mentioned guide member (body mold) 20.

The apparatus of this example replace the molds of FIG. 1 with the structure of FIG. 10. The rest is the same as in FIG. 10. According to this structure, the sleeve 60 is attached and fixed to the supporting rod 23. Since the upper mold 24 and the lower mold 22 are connected to the sleeve 60, it is possible to eliminate an effect on the upper mold and lower mold of the relative shift of the guide member 20.

What is claimed is:

1. A glass molding process for manufacturing a glass preform into a glass molded product, comprising the steps of:

preparing a mold for pressing the glass preform, wherein the mold comprises an upper mold member and a lower mold member each having a cavity surface for forming the glass molded product, and a frame mold member which is movable against the upper and lower mold member and incorporates a heating means;

introducing the glass preform, wherein the upper mold member is raised and the glass preform is placed on the cavity surface of the lower mold member;

heating and pressing the glass preform, wherein the frame mold member is moved so as to produce a proximal relationship between the heating means and the glass preform, thereby heating the glass preform to a temperature at which the glass preform is softened, and the glass preform is pressed by lowering the upper mold member to shape the glass molded product;

separating the glass molded product from the heating means by raising the upper mold member and moving the frame mold to allow the taking out of the glass molded product.

2. A glass molding process according to claim 1, wherein the frame mold member is provided with an introducing port for introducing the glass preform onto the cavity surface of the lower mold member further comprising the step of:

moving the frame mold member to a position permitting introduction of the glass preform onto the cavity surface of the lower mold member via the introducing port and introducing the preform onto the cavity surface of the lower mold member.

3. A glass molding process according to claim 2, wherein prior to said step of introducing the glass preform, inert gas is provided between the cavity surfaces of the upper and lower mold members through a gas ingress on the frame mold that is for introduction of inert gas.

4. A glass molding process according to claim 3, wherein the glass molded product is taken out through an exit port provided on the frame mold member for taking out the glass molded product by adjusting a position of said exit port to a position near the glass molded product through movement of the frame mold member.

5. A glass molding process according to claim 1, wherein said pressing step further comprises measuring a movement of the upper mold member when the upper mold member is given a load to deform the glass preform along the cavity surface in the pressing step.

6. A glass molding process using a glass molding apparatus in which an upper mold and a lower mold are housed in a frame mold, which is slidable in a lengthwise direction relative to the upper mold and the lower mold, such that the three molds form a mold cavity, comprising the steps of:
 introducing a glass preform into the mold cavity at a temperature lower than a glass transition temperature of the glass preform,
 closing the mold cavity by sliding the frame mold with respect to the upper and lower molds in the lengthwise direction of the frame mold while maintaining the distance between the lower mold and the upper mold greater than that on pressing,
 heating the glass preform to a molding temperature by radiation heat and conduction heat derived from heating of the lower mold, the upper mold and the frame mold, and
 pressing the lower mold and the upper molds closer together, to form a glass molded product from the glass preform, wherein
 a temperature distribution of the frame mold, in its lengthwise direction, is such that when the mold cavity is closed, the cavity is positioned at a high temperature side of the frame mold.

7. A glass molding process according to claim 6, wherein the glass preform is a spherical glass preform.

8. A glass molding apparatus for molding an optical element comprising:
 a frame mold member in which upper and lower mold members are incorporated so as to form a molding cavity, wherein said frame mold member is slidable relative to the upper and lower mold members;
 a first introducing pipe connected with said frame mold member for introducing a glass preform into the molding cavity;
 a second introducing pipe connected with said frame mold member for introducing an inert gas into the molding cavity;
 driving means for moving the frame mold member relative to the upper and lower mold members in order to alternatively provide communication between the first or second introducing pipe and the molding cavity; and
 pressing means for lowering the upper mold member, thereby press-molding the glass preform.

9. A glass molding apparatus for molding an optical element comprising:
 a frame mold member in which upper and lower mold members are incorporated so as to form a molding cavity, wherein said frame mold member is slidable relative to the upper and lower mold members;
 a first heater for heating the frame mold member to not less than a predetermined temperature;
 a second heater for heating the upper and lower mold members;
 driving means for moving the frame mold member relative to the upper and lower mold members while supporting the first heater;
 pressing means for lowering the upper mold member, thereby press-molding a glass preform, wherein
 the temperature of the frame mold member, heated by the first heater, is higher than that of the upper and lower mold members before the preform is introduced into the molding cavity and is held constant when the glass preform to be molded is introduced into the molding cavity, and wherein
 the temperature of the second heater is set lower than a molding temperature upon introducing of the glass preform, and is set to the molding temperature upon molding of the glass preform by the pressing means.

10. A glass molding apparatus in which an upper mold and a lower mold are housed in a frame mold the upper mold being slidable in a lengthwise direction of the frame mold and the three molds form a mold cavity comprising;
 heating means for providing a temperature distribution in the lengthwise direction of the frame mold;
 a first pipe connected to the frame mold for feeding a glass preform to be molded;
 a second pipe connected to the frame mold for taking out a molded product; and
 an introducing pipe connected to the frame mold for introducing non-oxidating gas into the mold cavity, wherein
 the pipe for feeding the glass preform to be molded includes an atmosphere replacing part, capable of being degassed, between two valves, through one of which the material to be molded can be passed, and wherein
 the pipe for taking out the molded product includes an atmosphere replacing part, capable of being degassed, between two valves through which the molded product can be passed.

* * * * *

UNITED STATES PATENT AND TRADEMARK OFFICE
CERTIFICATE OF CORRECTION

PATENT NO. : 5,250,099
DATED : October 5, 1993
INVENTOR(S) : KUBO, ET AL.

It is certified that error appears in the above-indentified patent and that said Letters Patent is hereby corrected as shown below:

Title page, item,
[56] FOREIGN PATENT DOCUMENTS:

Insert:
--58-84134    5/1983    Japan--;
--61-26528    2/1986    Japan--;
--1-105713    4/1989    Japan--;
--1-167242    6/1989    Japan--;
--59-150728   8/1984    Japan--;
--49-97009    9/1974    Japan--;
--63-11529    1/1988    Japan--; and
--378199      8/1932    United Kingdom--.

COLUMN 3:

Line 6, "process" should read --process,--;
Line 12, "mold," should read --mold;--;
Line 14, "where" should be deleted;
Line 28, "is" should read --and--;
Line 31, "is" should read --being--;
Line 36, "is" should read --being--;
Line 40, "are" should read --being--;
Line 45, "Preparing" should read --preparing--;
Line 50, "heating," should read --heating;--;
Line 55, "is" should read --being--;
Line 59, "mold." should read --mold;--; and
Line 65, "preform." should read --preform;--.

UNITED STATES PATENT AND TRADEMARK OFFICE
CERTIFICATE OF CORRECTION

PATENT NO. : 5,250,099
DATED : October 5, 1993
INVENTOR(S) : KUBO, ET AL.

It is certified that error appears in the above-indentified patent and that said Letters Patent is hereby corrected as shown below:

COLUMN 4:

Line 26, "aa" should read --a--;
Line 27, "having" should read --having a--;
Line 44, "cross sectional" should read --cross-sectional--;
Line 46, "cross sectional" should read --cross-sectional--;
Line 59, "apparatus" should read --the apparatus--;
Line 62, "cross sectional" should read --cross-sectional--; and
Line 66, "cross sectional" should read --cross-sectional--.

COLUMN 5:

Line 6, "cross sectional" should read --cross-sectional--;
Line 27, "upper" should read --the upper--;
Line 56, "degas-" should read --degass- --;
Line 59, "mold" should read --molded--; and
Line 60, "degasing" should read --degassing--.

UNITED STATES PATENT AND TRADEMARK OFFICE
CERTIFICATE OF CORRECTION

PATENT NO. : 5,250,099

DATED : October 5, 1993

INVENTOR(S) : KUBO, ET AL.

It is certified that error appears in the above-indentified patent and that said Letters Patent is hereby corrected as shown below:

COLUMN 6:

Line 7, "pipe 21" should read --pipe 21a--;
Line 11, "degass" should read --degas--;
Line 17, "degass" should read --degas--;
Line 26, "change" should read --changes--;
Line 28, "numerials" should read --numerals--;
Line 41, "Torr" should read --Torr.--; and
Line 56, "pipe 21 a" should read --pipe 21a--.

COLUMN 7:

Line 7, "hight" should read --height--;
Line 8, "above" should read --above,--; and
Line 49, "molds" should read --molds being--.

COLUMN 8:

Line 16, "pipe 2b" should read --pipe 21b--; and
Line 37, "was" should be --is--.

UNITED STATES PATENT AND TRADEMARK OFFICE
CERTIFICATE OF CORRECTION

PATENT NO. : 5,250,099
DATED : October 5, 1993
INVENTOR(S) : KUBO, ET AL.

It is certified that error appears in the above-indentified patent and that said Letters Patent is hereby corrected as shown below:

COLUMN 9:

Line 15, "degass" should read --degas--.

COLUMN 12:

Line 24, "Table 1." should read --Table 1,--;
Line 34, "Table 1." should read --Table 1,--; and
Line 44, "18 21" should read --18, 21--.

COLUMN 13:

Line 47, "27 a" should read --27a--; and
Line 68, "light" should read --a light--.

COLUMN 14:

Line 16, "replace" should read --replaces--.

UNITED STATES PATENT AND TRADEMARK OFFICE
CERTIFICATE OF CORRECTION

PATENT NO. : 5,250,099
DATED : October 5, 1993
INVENTOR(S) : KUBO, ET AL.

It is certified that error appears in the above-indentified patent and that said Letters Patent is hereby corrected as shown below:

COLUMN 15:

Line 19, "preform," should read --preform;--;
Line 24, "pressing," should read --pressing;--; and
Line 29, "mold, and" should read --mold; and--.

COLUMN 16:

Line 33, "mold the" should read --mold, the--.

Signed and Sealed this

Thirtieth Day of August, 1994

Attest:

BRUCE LEHMAN

Attesting Officer        Commissioner of Patents and Trademarks